United States Patent
Hughes et al.

(10) Patent No.: US 6,501,878 B2
(45) Date of Patent: Dec. 31, 2002

(54) OPTICAL FIBER TERMINATION

(75) Inventors: Richard P. Hughes, Kanata (CA); Trevor G. Zapach, Calgary (CA); Jill A. Oosterom, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 29 days.

(21) Appl. No.: 09/735,571

(22) Filed: Dec. 14, 2000

(65) Prior Publication Data

US 2002/0076152 A1 Jun. 20, 2002

(51) Int. Cl.[7] .................................................. G02B 6/35
(52) U.S. Cl. ............................................ 385/35; 385/43
(58) Field of Search ........................ 385/33–35, 31, 385/43, 47–48

(56) References Cited

U.S. PATENT DOCUMENTS 5,293,438 A  * 3/1994 Konno et al. ................. 385/35
5,403,308 A  * 4/1995 Wood et al. ................... 606/17
6,215,925 B1 * 4/2001 Kaneyama ..................... 385/35

* cited by examiner

Primary Examiner—Akm E. Ullah
Assistant Examiner—Jerry T Rahill
(74) Attorney, Agent, or Firm—Victoria Donnelly; Jean-Pierre Fortin

(57) ABSTRACT

The invention relates to an optical fiber and a fiber termination which provide an output of laser light propagating through the fiber in a required direction while focusing it into a small spot. In one embodiment of the invention the termination includes a tapered fiber rod with an angled ball formed at the end of the rod. A corresponding method of manufacturing of the termination is provided. In another embodiment the termination includes a fiber rod having an angled end and a GRIN lens disposed so as to receive light reflected from the angled end, the lens being an integral part of the termination. In other embodiments the lens is replaced with a cylindrical or tapered multimode stub which provide similar function.

20 Claims, 3 Drawing Sheets

OPTICAL FIBER TERMINATION

FIELD OF THE INVENTION

The invention relates to optical fiber terminations, and in particular to a termination which provides an output of a light beam in a direction traverse to the direction of the beam propagation.

BACKGROUND OF THE INVENTION

Existing optical fiber terminations are designed so as to reduce backward reflections of light into the fiber and/or to provide optimal coupling between two co-axial fibers. These functions are rather limited and do not solve a problem that has arisen recently because of the constant demand of reducing the size of optoelectronic components and increasing the density of optoelectronic packaging. The problem is concerned with utilizing a three dimensional space in a package more efficiently while using optoelectronic components of a smaller size. For example, it is preferred to mount semiconductor devices such as detectors parallel to the package base with the active area facing up. Also it is preferred to pass optical feedthrough fibers through the package sidewalls. Accordingly, it generates a requirement for the fiber to provide an output of the laser light in a flexible manner while ensuring enhanced functionality of the fiber and the use of minimal optical elements. Discrete optical components are costly-and difficult to align and therefore should be avoided. Additional requirements for the fiber or fiber termination of this kind would be simple design and manufacturing along with an easy alignment with other elements in a package.

None of the existing fiber terminations have addressed the above-mentioned problems so far.

SUMMARY OF THE INVENTION

It is therefore an object of the invention to provide an optical fiber termination which would provide enhanced functionality of the fiber while providing output of laser light in a flexible manner.

According to one aspect of the invention there is provided an optical fiber having an optical element formed at an end of the fiber, the element providing an output of a light beam, propagating through the fiber, in a direction traverse to the direction of the beam propagation while reshaping the beam into a spot of a required shape and size, the element being an integral part of the fiber.

Conveniently, the optical element is an angled ball, the angle of the angled surface of which is chosen so as to provide a total internal reflection of the beam. Depending on the requirements for the fiber, the diameter of the ball may be either substantially equal the diameter of the fiber or greater than the diameter of the fiber at a joint with the ball. Alternatively, the optical element may comprise an angled fiber end and a lens, the lens being disposed so as to receive the beam reflected from the angled fiber end. The lens may be replaced with a cylindrical or tapered multimode fiber section having a lens at its lens, or any other optical element which would provide a similar function. Conveniently, the fiber comprises a groove for receiving the lens.

Conveniently, the optical element provides the output of the light beam in a direction substantially perpendicular or perpendicular to the direction of the beam propagation within the fiber. Alternatively, it may provide output of the light beam in a direction forming an acute angle or obtuse angle with the direction of the beam propagation.

According to another aspect of the invention there is provided an optical fiber termination, comprising an optical element formed at one end thereof, the element being designed so that, when the termination is being coupled to a fiber, to provide an output of a light beam, propagating through the fiber, in a direction traverse to the direction of the beam propagation while reshaping the beam into a spot of a required shape and size, the element being an integral part of the termination.

Conveniently, the optical element is an angled ball, the angle of the angled surface of which is chosen so as to provide a total internal reflection of the beam. The diameter of the ball may be substantially equal the diameter of the fiber or greater than the diameter of the fiber at a joint with the ball depending on the requirement for the fiber termination. Alternatively, the optical element of the termination may be formed by an angled fiber end and a lens, the lens being disposed so as to receive the beam reflected from the angled fiber end. In other embodiments of the invention the lens is replaced with a cylindrical or tapered multimode section, having a lens at the end of the taper, which a provide similar function.

Conveniently, the termination provides the output of the light beam in a direction perpendicular or substantially perpendicular to the direction of the beam propagation. Alternatively, the termination may provide output of the light beam in a direction forming an acute or obtuse angle with the direction of the beam propagation. Additionally, an assembly of an optical fiber and the termination described above is provided, thus forming a combined optical fiber, wherein the other end of the termination is appended, e.g. spliced, to the optical fiber.

BRIEF DESCRIPTION OF THE DRAWINGS

Embodiments of the invention will now be described, by way of example, with reference to the accompanying drawings in which:

FIG. 1b is an enlarged end portion of the fiber termination of FIG. 1a;

FIG. 2 is a cross sectional view of the fiber termination of FIG. 1a;

DESCRIPTION OF THE PREFERRED EMBODIMENTS

Figure 1A:
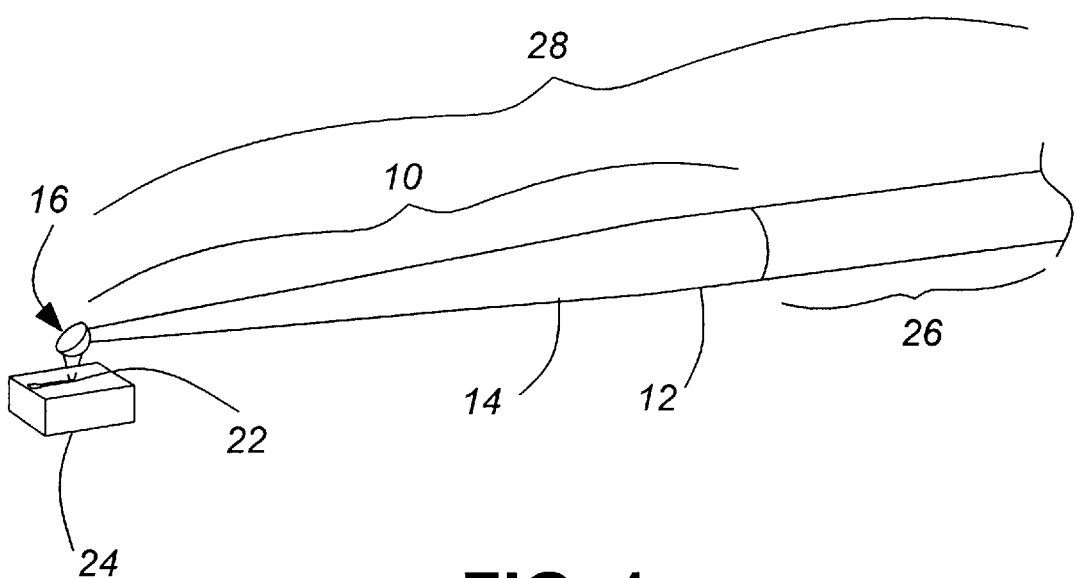
FIG. 1a is an isometric view of an optical fiber termination according to a first embodiment of the invention.
Figure 1B:
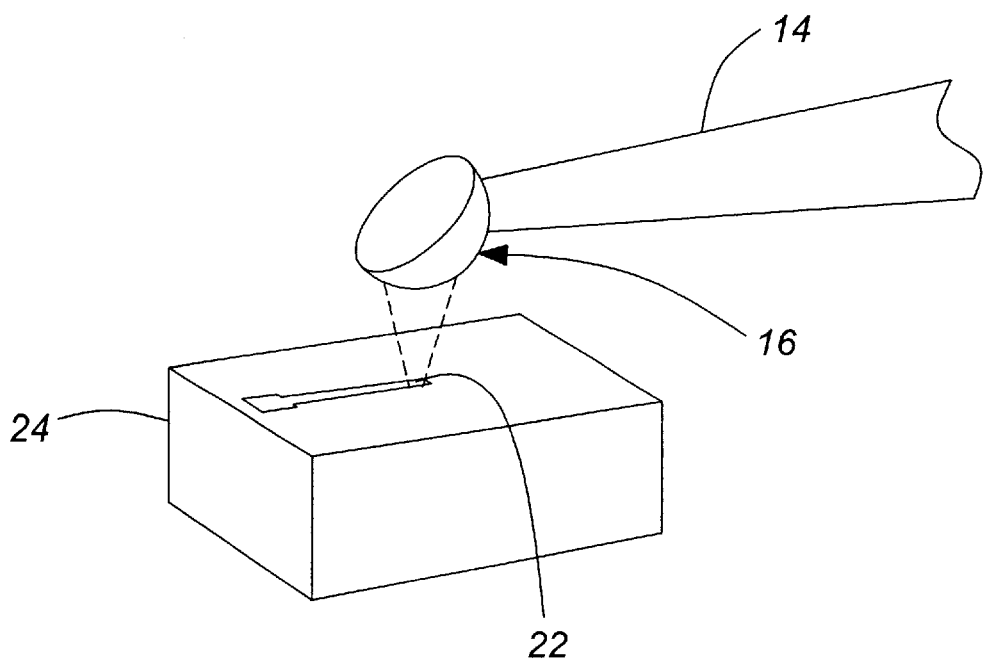

As shown in FIGS. 1a and 1b, the optical fiber termination 10 according to the first embodiment of the invention comprises a short fiber stub 12 which has a section tapered to one of its ends as designated by reference numeral 14, and has an optical element 16 formed at that end. The optical element 16 provides reflection of a light beam 18, propagating along the fiber axis 20 (shown in FIG. 2), in a direction traverse to the direction of the beam propagation and focuses it into a small spot 22 onto an active area of a semiconductor detector 24. The other end of the fiber termination 10 is appended, preferably spliced, to an optical fiber 26 to form a combined optical fiber 28.

Figure 2:
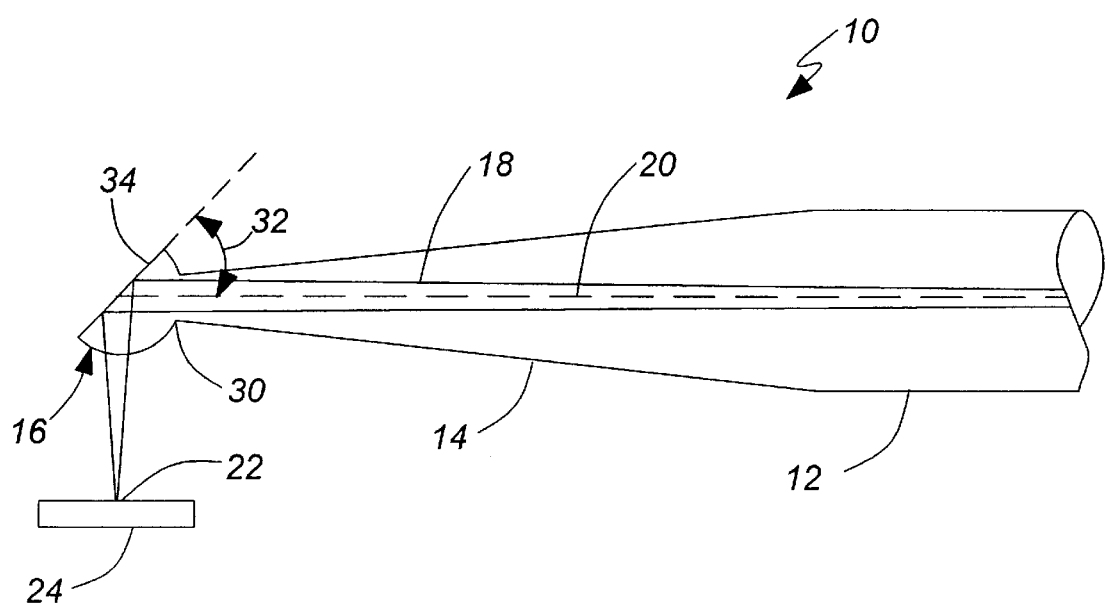

As shown in more detail in FIG. 2, the optical element 16 includes an angled ball which has a diameter greater than the diameter of the tapered section at a joint 30 with the ball. The angle 32 of the angled surface of the ball 34 is about 45 degrees to the fiber axis 20, the angle being chosen so as to provide a total internal reflection of the beam 18 propagating through the fiber. The mode field diameter increases in the taper section. Therefore, as the beam 18 propagating down the core of the fiber enters the tapered section 14, the beam diameter expands. The expanded beam is reflected at about 90 degrees by the polished angled surface 34 of the ball 16. As the light exits the fiber, it is focused by the spherical surface of the ball into the spot 22.

The fiber termination 10 is manufactured in the following manner. An optical fiber is heated by flame or electric arc and pulled to form a tapered section. The tapering continues until the fiber is severed. The pointed fiber end is then carefully melted so that the surface tension in the melted fiber forms a ball at the end of the fiber. Part of the ball is then ground away, and the flat surface polished so as to provide total internal reflection of the light propagating through the fiber. The diameter of the ball would be typically about 60 micron, the taper diameter about 15 micron where it joins the ball, and the taper length of about 2 millimeters. It is understood for those skilled in the art that these dimensions may vary depending upon the application.

Thus, the termination 10 provides a dual functionality by simultaneously reflecting the beam in a required direction and changing the shape of the beam by focusing it into a small spot.

In modifications to the above embodiment, the termination may or may not include the tapered section, and the diameter of the ball may vary from being smaller than the diameter of the fiber to being substantially equal to the diameter of the fiber. The optical element may provide output of the light beam in a required direction relative to the direction of the beam propagation (fiber axis), e.g. in a direction which would form an acute, obtuse, perpendicular or substantially perpendicular angle with the fiber axis. The fiber termination 10 described above may be formed either as a separate item or as an end section of an optical fiber.

Figure 3:
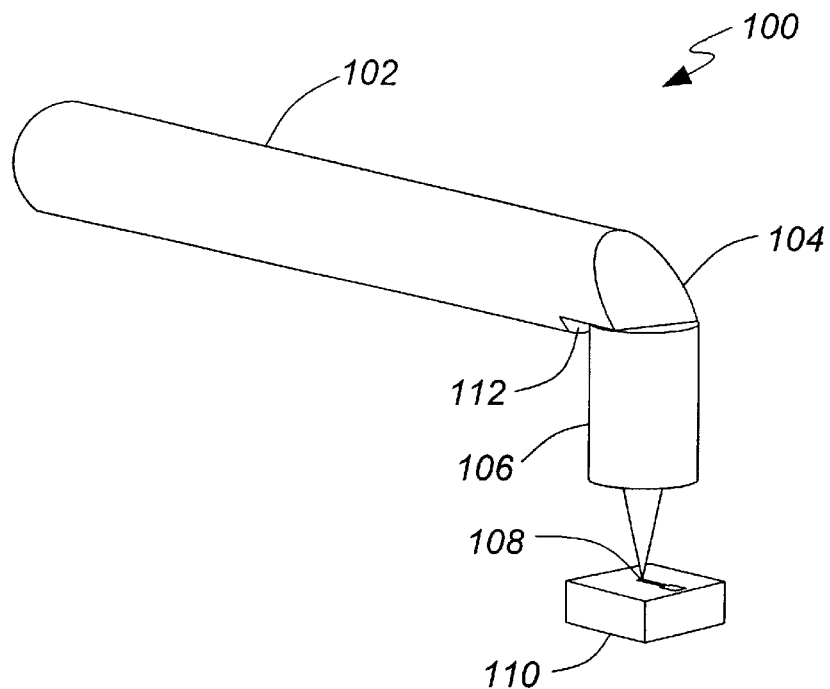
FIG. 3 is an isometric view of an optical fiber termination according to a second embodiment of the invention.

An optical fiber termination 100 according to the second embodiment of the invention is illustrated in FIG. 3. It comprises a short fiber stub 102 having an angled end 104 which reflects a light beam, travelling along the fiber, in a traverse direction relative to the fiber axis, and a GRIN lens 106 disposed so as to receive the reflected light and to focus it into a small spot 108 onto an area of a photodetector 110 or any other optical element (as required). Conveniently, the laser rod 102 has a groove 112 for receiving the lens 106. The lens 106 is made integral with the fiber rod by using an index matching adhesive so as to form the termination 100 as an integral component.

Conveniently, in modifications to the second embodiment, the GRIN lens may be replaced with a multimode fiber section of a similar shape or any other optical element which would provide a similar function.

Figure 4:
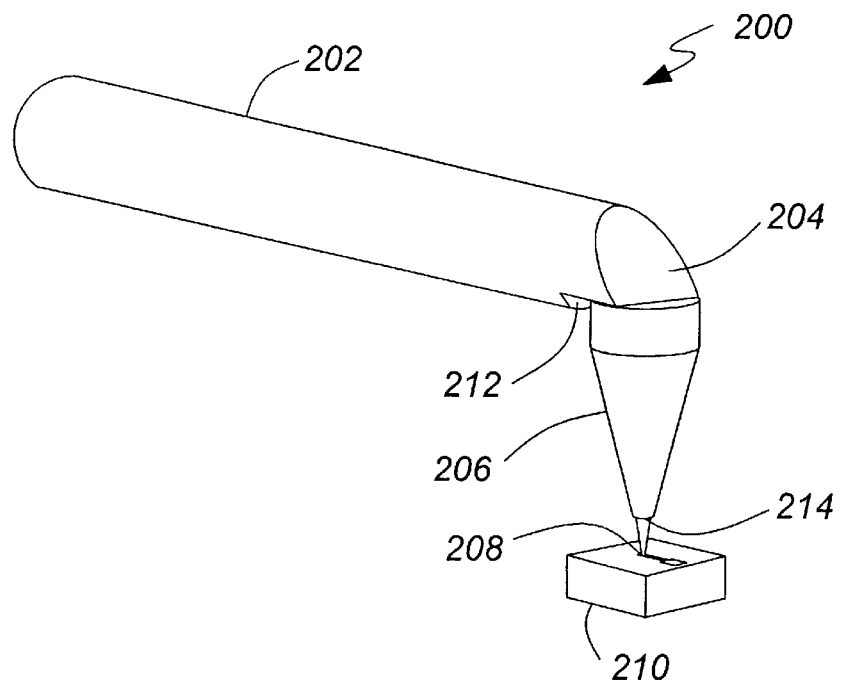
FIG. 4 is an isometric view of an optical fiber termination according to a third embodiment of the invention.

The fiber termination of the third embodiment of the invention is illustrated in FIG. 4. It is similar to that of the second embodiment of FIG. 3 except for the GRIN lens 106 being replaced with a tapered multimode fiber stub 206 whose end is rounded so as to form a lens 214 which focuses a light beam in a similar manner. Similar elements in FIGS. 3 and 4 are referred to by the same reference numerals incremented by 100.

The terminations 100 and 200 of the second and third embodiments can be made as separate items (to be further appended to optical fibers, e.g. spliced) or as end sections of optical fibers.

Thus, it will be appreciated that, while specific embodiments of the invention are described in detail above, numerous variations, modifications and combinations of these embodiments fall within the scope of the invention as defined in the following claims.

What is claimed is:

1. An optical fiber having an optical element formed at an end of the fiber, said element being comprised of an angled fiber end and a lens for providing an output of a light beam, propagating through the fiber, in a direction traverse to the direction of the beam propagation while reshaping the beam into a spot of a required shape and size, said lens being disposed so as to receive the beam reflected from the angled fiber end and said fiber further comprises a groove for receiving said lens.

2. A fiber as defined in claim 1, wherein said angled fiber end is an angled ball, the angle of the angled surface of the ball being chosen so as to provide a total internal reflection of the beam.

3. A fiber as defined in claim 2, wherein the diameter of the ball is substantially equal the diameter of the fiber.

4. A fiber as defined in claim 2, wherein the diameter of the ball is greater than the diameter of the fiber at a joint with the ball.

5. A fiber as defined in claim 1, wherein the lens is a GRIN lens.

6. A fiber as defined in claim 1, wherein the lens is comprised of a multimode fiber section.

7. A fiber as described in claim 6, wherein the multimode fiber section is a tapered multimode section whose end is rounded so as to form a lens.

8. A fiber as described in claim 1, wherein the output of the light beam is provided in a direction substantially perpendicular to the direction of the beam propagation.

9. A fiber as described in claim 1, wherein the output of the light beam is provided in a direction perpendicular to the direction of the beam propagation.

10. A fiber as defined in claim 1, wherein the output of the light beam is provided in a direction forming an acute angle with the direction of the beam propagation.

11. A fiber as defined in claim 1, wherein the output of the light beam is provided in a direction forming an obtuse angle with the direction of the beam propagation.

12. An optical fiber termination, comprising an optical element formed at one end thereof, the element being designed so that, when the termination is being coupled to a fiber, to provide an output of a light beam, propagating through the fiber, in a direction traverse to the direction of the beam propagation while reshaping the beam into a spot of a required shape and size, the element being an integral part of the termination, and being further comprised of an angled fiber end and a lens, the fiber end having a groove to receive the lens and the lens being disposed so as to receive the beam reflected from the angled fiber end.

13. A termination as defined in claim 12, wherein the lens is a GRIN lens.

14. A termination as defined in claim 13, wherein the lens comprises a multimode fiber section.

15. A termination as defined in claim 14, wherein the multimode fiber section is a tapered multimode section whose end is rounded so as to form a lens.

16. A termination as defined in claim 12, wherein the output of the light beam is provided in a direction substantially perpendicular to the direction of the beam propagation.

17. A termination as defined in claim 12, wherein the output of the light beam is provided in a direction perpendicular to the direction of the beam propagation.

18. A termination as defined in claim 12, wherein the output of the light beam is provided in a direction forming an acute angle with the direction of the beam propagation.

19. An assembly of an optical fiber and a termination as described in claim 12 to form a combined optical fiber, wherein the other end of the termination is appended to the optical fiber.

20. An assembly as defined in claim 19, wherein the termination is spliced to the optical fiber.

* * * * *